United States Patent [19]

David

[11] Patent Number: 4,650,400

[45] Date of Patent: Mar. 17, 1987

[54] HELICOPTER BLADE PITCH ADJUSTING SYSTEM

[76] Inventor: Constant V. David, 4952 Field St., San Diego, Calif. 92110

[21] Appl. No.: 593,047

[22] Filed: Mar. 26, 1984

[51] Int. Cl.[4] .............................................. B64C 27/605
[52] U.S. Cl. .................................. 416/114; 416/132 R
[58] Field of Search ............... 416/114, 115, 112, 113, 416/132 R, 98

[56] References Cited

U.S. PATENT DOCUMENTS

| | | | |
|---|---|---|---|
| 1,427,015 | 8/1922 | Pescara | 416/24 |
| 2,475,121 | 7/1949 | Avery | 416/114 |
| 2,491,260 | 12/1949 | Green | 416/98 |
| 2,512,461 | 6/1950 | Jenny | 416/114 |
| 2,584,663 | 2/1952 | Bensen | 416/155 X |
| 2,667,227 | 1/1954 | Laskowitz | 416/115 |
| 2,720,272 | 10/1955 | Prince | 416/114 |
| 2,845,132 | 7/1958 | Heckman | 416/114 X |
| 2,919,753 | 1/1960 | Hook | 416/114 X |
| 3,031,017 | 4/1962 | Arcidiacono | 416/114 |
| 3,504,989 | 4/1970 | Kisovec | 416/135 B |
| 3,525,576 | 8/1970 | Dorand | 416/114 X |
| 3,756,743 | 9/1973 | Robertson | 416/114 X |
| 4,573,873 | 3/1986 | Yao et al. | 416/114 |

FOREIGN PATENT DOCUMENTS

| | | | |
|---|---|---|---|
| 31386 | 3/1923 | Denmark | 416/115 |
| 610434 | 3/1935 | Fed. Rep. of Germany | 416/114 |
| 146835 | 10/1921 | United Kingdom | 416/23 |
| 531608 | 1/1941 | United Kingdom | 416/114 |

Primary Examiner—Everette A. Powell, Jr.

[57] ABSTRACT

A helicopter blade positioning mechanism provides collective and cyclic pitch angle adjustment of the blades independently. This mechanism is all enclosed within the blade driving axle. The pitch angle of each blade is adjusted collectively and cyclicly by direct action on and within the blade hub. No other linkage is required between the blade and the blade pitch actuation means. The cyclic pitch adjustment of each blade is obtained either by a rotation imparted to the whole blade body or by twisting the blade, depending upon the mechanism configuration used. In both cases, the cyclic pitch variations are superimposed on the collective pitch setting, vary sinusoidally as the blades gyrate around their vertical axis of gyration, one full pitch variation cycle for each full gyration of the blades. This mechanism plays the role and replaces the well known swash-plate/linkage arrangement used on most helicopters.

22 Claims, 18 Drawing Figures

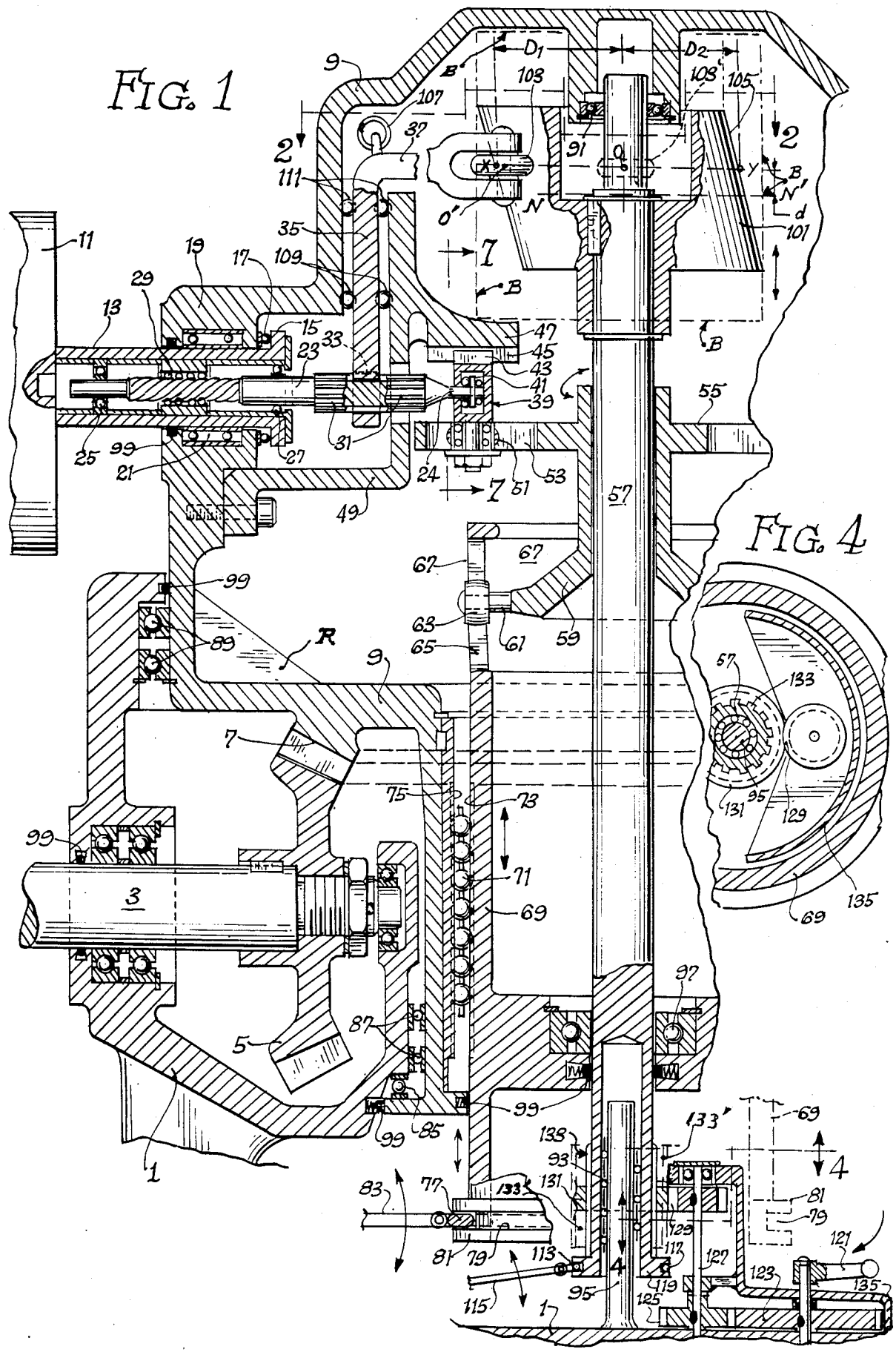

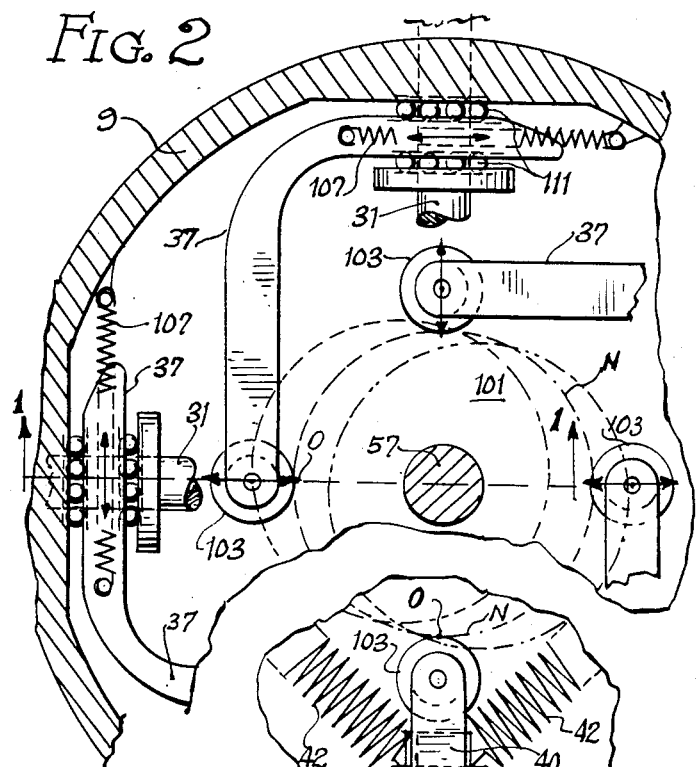
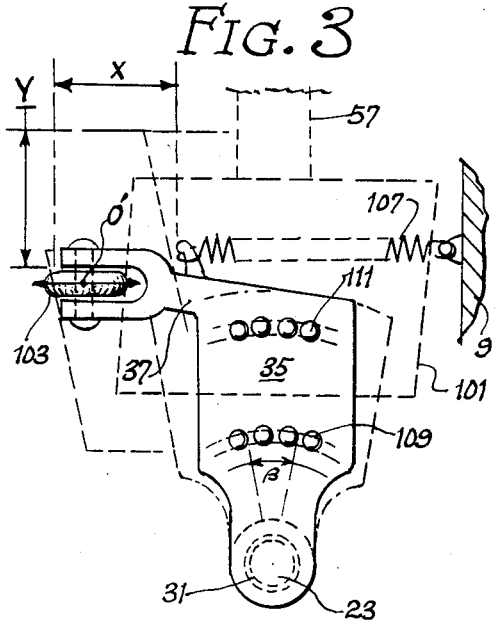
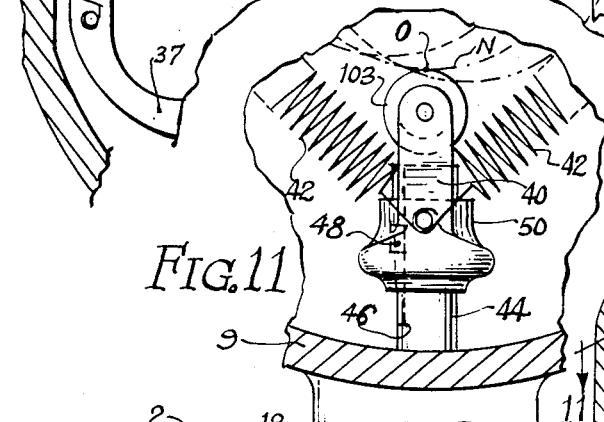
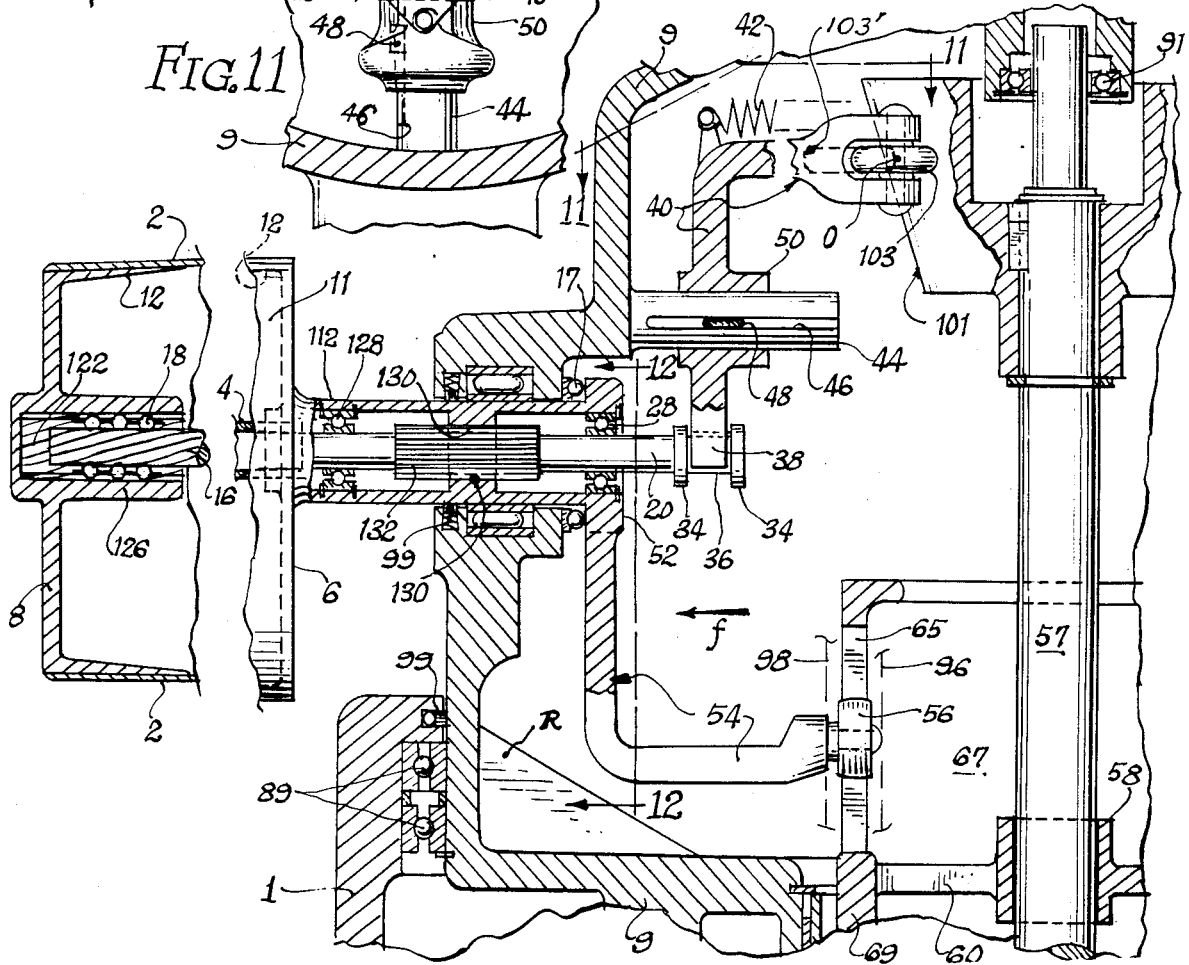

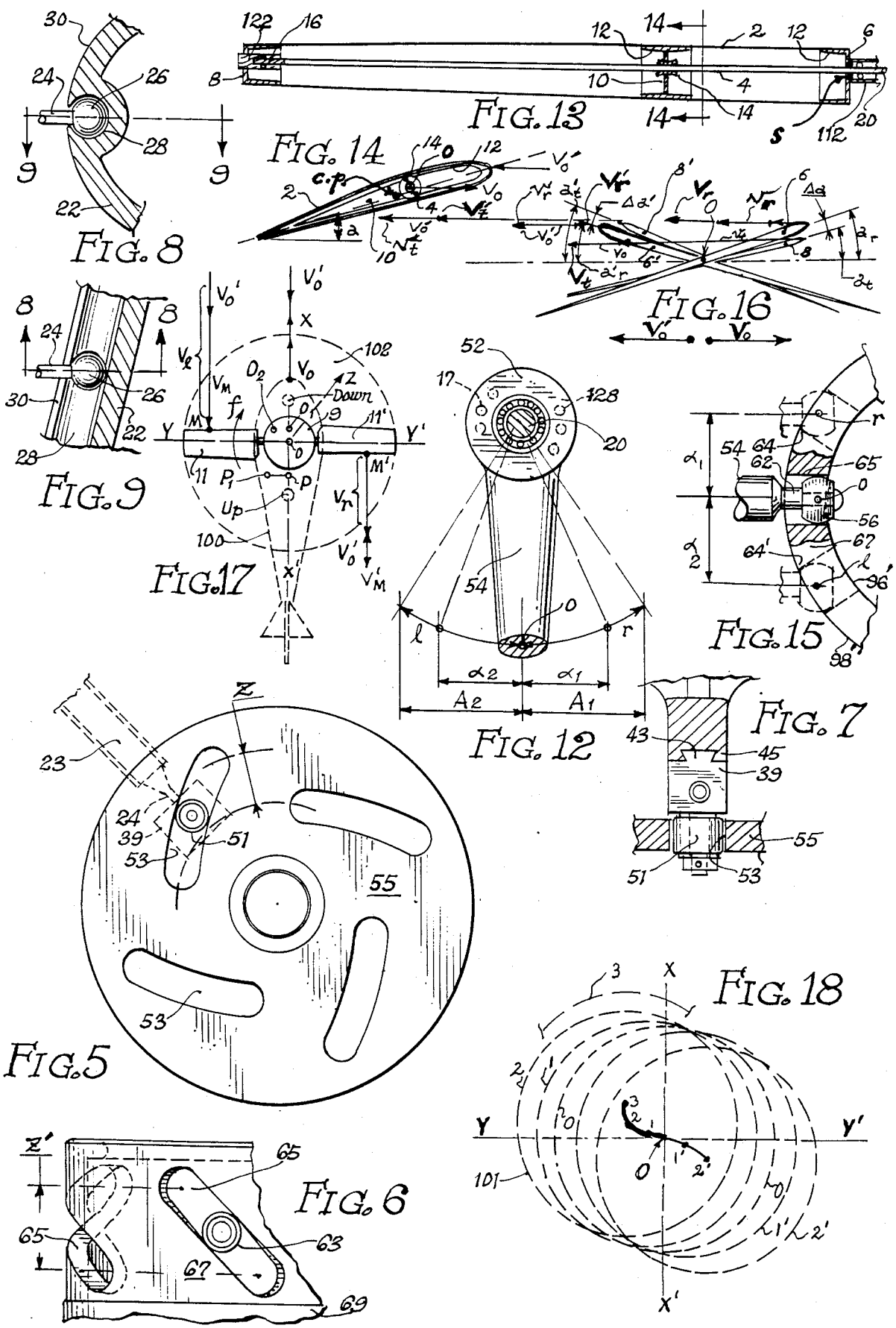

HELICOPTER BLADE PITCH ADJUSTING SYSTEM

BACKGROUND OF THE INVENTION

The present invention relates to the pitch actuating and control of helicopter blades, and more particularly, to the independent adjustment of both collective and cyclic pitches by direct action on the blade hubs only.

Since helicopters were developed and almost universally, the setting and control of the angle of attack (pitch) of helicopter blades have been performed, for both collective and cyclic pitches, by means of a swash plate that moves up and down and can also tilt. These two independent types of motion provide the means to set and control the blade pitch for any power setting and/or direction of motion of the helicopter. The swash plate is linked to the edge of the blade, near the blade hub attachment to the vertical main power drive shaft. This means that the swah plate and the linkage arrangement are usually not enclosed and are exposed to any environmental conditions that may prevail around the helicopter (sand, dust, salty mist, rain, snow, hail, etc . . .) at the time. This has always made the maintenance and servicing of helicopters costly and burdensome.

Enclosing and thereby protecting such mechanisms is therefore very desirable. Preferably this should be accomplished without sacrificing weight, space and performance. Both cost and risks of part failure should not be increased but, if possible, even lowered. Also, such improvements should permit the use of a plurality of blades gyrating concentrically.

SUMMARY OF THE INVENTION

It is therefore a primary object of the present invention to provide an improved helicopter blade drive which encloses the blade pitch actuating and control mechanisms.

It is another object of the present invention to provide an improved helicopter blade drive which sets the blade pitch by direct action on and within the blade hub.

It is another object of the present invention to provide an improved helicopter blade drive which sets the blade pitch for collective and cyclic actuation and control independently, automatically and simultaneously, at any time, as required by the pilot.

It is still another object of the present invention to provide an improved helicopter blade drive which adjusts the blade cyclic pitch by twisting the blade spanwise.

Accordingly, the present invention provides a combined gear and cam box. The blades are connected to this gear and cam box by hubs that are rigidly held in the axial direction. The hubs are however free to rotate around their axes. The hub rotation and the angular setting of the hubs are determined by the cam position inside the box, which plays the role of a blade rotor. The cam positions are set and adjusted by mechanical means under pilot's control. All blades are thus rotationally actuated identically and simultaneously by one common mechanism.

DESCRIPTION OF THE DRAWINGS

FIG. 1 is a partial midsectional elevation view of one version of the helicopter blade drive (rigid blades).

FIG. 2 is a combined partial top view and sectional view taken along line 2—2 of FIG. 1.

FIG. 3 is a side view of a cam roller and of its articulated supporting lever.

FIG. 4 is a partial sectional view taken along line 4—4 of FIG. 1.

FIG. 5 is a top view of the cam plate controlling the collective pitch adjustment.

FIG. 6 is a partial side external elevation view of the cylindrical cam that actuates the cam plate.

FIG. 7 is a detailed partial sectional view taken along line 7—7 of FIG. 1.

FIG. 8 is a detailed partial sectional view taken along line 8—8 of FIG. 9.

FIG. 9 is a detailed partial sectional view taken along line 9—9 of FIG. 8.

FIG. 10 is a partial midsectional elevation view of another version of the helicopter blade drive (twistable blades).

FIG. 11 is a detailed combined partial top view and sectional view taken along line 11—11 of FIG. 10.

FIG. 12 is a partial side elevation view of the blade hub actuating lever.

FIG. 13 is a midsectional plan view of a twistable blade assembly.

FIG. 14 is a cross-sectional view taken along line 14—14 of FIG. 13 of a twistable blade profile.

FIG. 15 is a combined partial sectional and top views of a typical roller/cylindrical cam arrangement.

FIG. 16 is a diagram showing the blade tip and root profiles of typical blades positioned at a 180° gyration angle and of the corresponding velocity vectors and angles of attack of these two profiles.

FIG. 17 is a diagrammatic plan view of two helicopter blades orthogonally positioned with respect to the helicopter longitudinal axis, showing the velocity vectors and points of application of the lift forces developed by the gyration of these blades.

FIG. 18 is a diagram showing the various positions of the cyclic pitch control cam and the corresponding positions of the lift forces, during an acceleration forward of the helicopter.

DETAILED DESCRIPTION OF THE INVENTION

Referring to the drawings of FIGS. 1 to 7, the helicopter blade drive comprises a fixed housing 1 solidly mounted on the helicopter frame, a power drive shaft 3 connected to the engine and equipped with a driving gear 5 that engages a bevel gear 7 solidly attached to rotating housing 9 which holds a plurality of blades 11 mounted on hubs 13. Hub 13 is retained axially by flange 15 that transmits the centrifugal force exerted by blade 11 on thrust bearing 17 that pushes against the wall of housing 9. Hub 13 can rotate within housing boss 19 and transmits blade 11 bending moment to housing 9 by means of double bearing assembly 21. The angular position of hub 13, hence of blade 11, is determined and held by the axial and longitudinal positions of control shaft 23 located inside hub 13. Control shaft 23, guided by slip bearings 25 and 27, can rotate and slide longitudinally and is connected to hub 13 by helically splined ball bearing 29. Control shaft 23 is equipped with axial male splines 31 that engage into female splines 33 located on rotating arm 35 of lever arm 37. A sliding member 39 mounted on the end 41 of control shaft 23 monitors its longitudinal travel. Member 39 is guided by tenon 43 which slides in dovetailed groove 45 inside boss 47 attached to housing 9 by means of structure 49 bolted to housing 9. Member 39 is equipped with roller 51 that slides inside groove 53 in camplate 55 which can slide and rotate freely on central shaft 57. Camplate 55 body 59 is equipped with a plurality of fingers 61 that support rollers 63 which slide inside slots 65 helically cut into the upper wall 67 of sleeve 69. Sleeve 69 is mounted inside housing 9 and guided longitudinally by sliding ball bearing 71 which rolls in axial grooves 73 and 75. The bottom part of sleeve 69 is engaged by fork 77 located inside groove 79 in flange 81 which is part of sleeve 69. Command lever 83 affixed to fork 77 determines the axial location of sleeve 69.

Rotating housing 9 transmits both vertical lift and lateral blade forces and moments to fixed housing 1 by means of thrust bearing 85 and bearing assemblies 87 and 89. Central shaft 57 is axially guided and laterally retained by slip ball bearings 91, located at the top of housing 9, and 93 located at the other end. Bearing 93 is mounted on guiding stem 95 attached to fixed housing 1. Sleeve 69 is also free to slide on central shaft 57 and is guided by slip ball bearing 97. The spaces inside housings 1 and 9 are sealed by slip seals 99. A two-dimensional cam 101 is mounted on the upper end of central shaft 57 and moves with it rotationally and axially. A plurality of rollers 103 mounted on lever arms 37 are kept in constant contact with the cam surface 105 by springs 107 attached to housing 9. Arms 35 and 37 are guided in their oscillatory motions around the axis of control shaft 23 by semilinear bearings 109 and 111. The axial motion of central shaft 57 is monitored by fork 113 actuated by command lever 115 and engaged in groove 117 located in flange 119 at the bottom of shaft 57. The rotational motion of shaft 57 is controlled by command lever 121 by means of the actuation of gears 123 and 125, axle 127 and herringbone gear train 129. Herringbone gear 131 bore is splined to match the axial splines 133 cut on central shaft 57. Structure 135 mounted on fixed housing 1 and also fitting inside sleeve 69 holds train gear 129 assembly in place. Herringbone gear 131 can be eliminated if gear 129 is made to drive central shaft 57 directly by replacing axial splines 133 by an elongated gear as is shown by phantom lines 133'. In that case, gear 129 does not need and does not have herringbone teeth, but straight cut teeth, so that its teeth can mesh with and slide within the elongated teeth of gear 133'. It should be pointed out that, except for fixed housing 1, the parts directly and solidly attached to it: drive shaft 3 and gear 5, central shaft 57 and cam 101; all other components rotate with the blades and housing 9 around the centerline of central shaft 57. This shaft constitutes the centerline and principal axis of the helicopter propulsion means. Blades 11 are longitudinally ridid and the whole blade 11 rotates around its own longitudinal axis, together with hub 13.

A different arrangement of blade angular control is presented in FIGS. 8 and 9 in which the axial driving mechanism of control shaft 23 of FIGS. 1, 5, 6 and 7 is replaced by a hollow conical cam body 22 mounted on the top end of sleeve 69 instead of upper wall 67. Cam body 22 is equipped with a plurality of grooves 28 located along a generatrix of cone wall 30. Balls 26 riding inside grooves 28 are mounted on stems 24 which are part of control shaft 23. Boss 47, used previously to guide member 39, is eliminated in this arrangement and the connection between sliding sleeve 69 and control shaft 23 is made directly by means of grooves 28 and balls 26.

FIGS. 10 to 14 show another configuration of the present invention. It also comprises a fixed housing 1, a rotating housing 9, a sliding sleeve 69, central shaft 57 and cam 101 assembly, a plurality of blades 11, and rollers 103, seals 99, ball bearings 89 and 91. Blades 11 have a low torsional rigidity and can be easily twisted spanwise. They include a skin 2, rigid in the longitudinal direction, a rigid central hollow shaft 4 attached to control shaft 20, end spars 6 and 8, midspars such as 10 located at intervals between end spars 6 and 8, flanges such as 12 connecting the spars to blade skin 2, and bearings such as 14 mounted on spars 10 and supporting shaft 4. The end of shaft 4 at the tip of blade 11 has helical splines 16 engaged by a linear ball bearing 18 nested in the reverse pitch helical female splines 122 of end hub 126 which is part of end spar 8. Hub 112 is solidly mounted on the other end spar 6 at blade 11 root location. Control shaft 20 is centered by ball bearings 128 inside hub 112 which has axial female splines 130 engaged into axial male splines 132. Control shaft 20 is terminated at the other end by a set of flanges 34 that forms a groove 36. That groove is engaged by a fork 38 which is part of sliding toggle lever 40. The other end of toggle lever 40 holds roller 103. The assembly of roller 103 and lever 40 is constantly pulled against cam 101 by springs 42 which are attached to lever 40 and rotating housing 9. An axial groove 46 is engaged by a key 48 encased in hub 50 of lever 40. The end of hub 112 inside housing 9 is terminated by flange 52 which is constantly pushed against thrust bearing 17 by the centrifugal force exerted on blade 11 assembly. Lever 54 attached to flange 52 at one end supports rollers 56 at the other end. Rollers 56 ride inside slots 65 cut inside wall 67 which is mounted on sliding sleeve 69, as depicted in FIGS. 6 and 10.

In both configurations of FIGS. 1 and 10, the up-and-down sliding motion of sleeve 69 causes the control shaft to rotate in order to set blade 11 pitch angle. In both configurations of the present invention, this can also be achieved by making slots 65 straight along a generatrix of circular wall 67, and by making splines 73 and 75 of FIG. 1 helically wound instead of straight along a generatrix, as previously described. Also, at the upper end of sleeve 69, sleeve 69 can also be supported by central shaft 57 by means of a sliding journal bearing 58 connected to sleeve 69 by a plurality of spokes 60. In the case of the second configuration of the present invention, the outer surfaces of rollers 56 are spherical to accommodate the rotation of slots 65 around central shaft 57, as is shown in FIG. 15. As lever arm 54 oscillates between the extreme left (l) and extreme right (r) positions shown in FIG. 12, roller 56 slides along the sides of slot 65 thanks to its spherical outer surface. Shank 62 that connects roller 56 to lever 54 has a length and a diameter such that the outer edges 64 and 64' of slot 65 are never contacted, even in the cases of their extreme positions as demonstrated by the phantom line outlines of roller 56. These extreme positions correspond to lever arm 54 oscillating through its full range $\alpha_1 + \alpha_2$.

DISCUSSION AND OPERATION OF THE INVENTION

The flight of a helicopter is controlled by the motion of its blades as they gyrate around their vertical driving shaft. The lifting force is provided by the average pitch angle of the blades (collective pitch). The forward propulsive force results from the inclination of the disk made by the gyrating blades. This disk inclination is obtained by means of the adjustment of the blade pitch angle, as the blades gyrate around the vertical driving shaft (cyclic pitch). Given a lifting force and a forward velocity, both collective pitch and cyclic pitch are determined and fixed at a given altitude, for a given craft weight and a given rate of gyration of the blades. The diagrams of FIGS. 14 and 16, in the case of a twistable blade, show how the helicopter forward velocity $V_o$ influences the various velocities of the blade, at its tip and at its root locations, with respect to the ambient air. With the helicopter moving at velocity $V_o$, the ambient air moves at velocity $V_o' = -V_o$. With the notations shown in FIGS. 14 and 16 and if the subsript t refers to the blade tip and the subsript r refers to the blade root, the various actual velocities of blade tip and root with respect to the ambient air are:

$$V_t = v_t + V_o,$$

$$V_t' = v_t' - V_o,$$

$$V_r = v_r + V_o$$

and $$V_r' = v_r' - V_o$$

where $V_t$, $V_r$, $v_t$ and $v_r$ refer to the blades moving forward and $V_t'$, $V_r'$, $v_t'$ and $v_r'$ refer to the blades moving backward if the helicopter is viewed from the side. Because the helicopter is assumed to be moving along a straight course at a constant forward speed, steady state operating conditions can be assumed. Under such circumstances, the lift force provided by the blades on one side of the helicopter must be equal to the lift force generated by the blades on the other side at all times. It follows that, because $V_t > V_t'$, the angle of attack $a_t$ of the blade moving forward must be smaller than the angle of attack $a_t'$ of the blade moving backward. It is understood that $V_o$ must always remain much lower than $v_t'$, for obvious reasons. The angle of attack of the blades then must vary by an amount $\Delta a + \Delta a'$ when they move from extreme right to extreme left (or vice versa) with respect to the forward direction, every 180°, or from one extreme position to the other and back twice for each full turn of the blades in their gyrating motion. For ease of understanding, this motion can be assumed to be of a sinusoidal nature and it constitutes the cyclic pitch variation. The mechanism that generates such cyclic pitch changes must be fully automatic and synchronized with the blade gyration, with no risk of slippage. Because the forward helicopter speed should not influence its altitude, and vice versa, the controls of the collective pitch and of the cyclic pitch must be independent of each other. The present invention embodiments fulfill both requirements, as is shown below.

In the first embodiment of FIGS. 1 to 7, the collective pitch is obtained and set by rotating hub 13 which is attached to a rigid blade 11. The axial motion of control shaft 23 by means of ball bearing assembly 29 and its helical splines determines the angular position of hub 13 and thereby of blade 11. It remains fixed as long as control shaft 23 does not move axially and does not turn. As control shaft 23 rotates, without any axial motion, hub 13 turns with it by the same angular amount. Therefore, an angular displacement of hub 13 can thereby be superimposed on the first type of motion already mentioned. The second displacement can be cyclical in nature and it is obtained by means of lever 37, roller 103 and cam 101. Assuming that the cam horizontal cross-section is a circle, along line X-Y, the distance $D_1$ from X to 0 (located on the centerline) is larger than distance $D_2$ from 0 to Y, as depicted in FIG. 1. The contact between roller 103 and cam 101, as shown in FIG. 2 is actually at point 0 of FIG. 1, which is the projection of this contact point in FIG. 2. Roller 103 is shown offset from that point 0 of FIG. 1 for the sake of clarity and lever arm 37 is shown broken. With lever arm 37 not shown broken, point 0' would be at point 0 and roller 103 would be in position 103' shown in phantom line. For a set angular position of command lever 121, central shaft 57 and therefore cam 101 also assumes a fixed angular position with respect to housing 1 or to the helicopter frame. As the blades and housing 9 rotate, rollers 103 are displaced and an oscillatory movement, perfectly synchronized with the blade gyration, results. It is transmitted to oscillatory plate 35, and by means of axial splines 31 and 33, to control shaft 23. In this embodiment of the present invention, cam 101 position is offset 90° with respect to the helicopter axis. This is compensated by having cam 101 turned 90° in the other angular direction to correct for this offset. Now, when control shaft 23 moves axially to change the collective pitch, there is no interaction with plate 35 or lever 37. Therefore, both collective pitch and cyclic pitch controls are truly and fully independent. To change the amplitude of the cyclic pitch, and thereby the helicopter forward speed, cam 101 is raised or lowered by means of command lever 115 that sets the axial position of central shaft 57. The maximum amplitude of the cyclic pitch is represented by the total displacement X of roller 103 which corresponds to one full rotation of cam 101, as shown in FIG. 3, whenever roller 103 is located at the bottom end of the total vertical travel Y of cam 101. For any other position of roller 103, such as 0', located within displacement Y, the amplitude of the cyclic pitch can be adjusted between 0 and the maximum amplitude previously defined. The total amount of collective pitch adjustment available corresponds to the total axial displacement Z of roller 51 inside guiding slot 53 of plate 55, as shown in FIG. 5, which corresponds to the total displacement Z' of roller 63 inside guiding opening 65 of sleeve 69, a shown in FIG. 6. To summarize, command lever 121 controls the direction of the helicopter flight with respect to its frame and command lever 115 controls its velocity. Command lever 83, by means of sliding sleeve 69, slots 65, rollers 63, plate 55, slots 53, rollers 51 and splined bearings 29, controls the amount of lift generated by the blades in their gyrating motion around central shaft 57.

Corrections of a minor degree of importance and common to the flight control of all helicopters should be mentioned here, although not part of the present invention. They pertain to the handling of the feedback and crosslinking that take place between the various controls: engine power, collective pitch, cyclic pitch and gyroscopic moment of the "blade disk", and which manifest themselves during transient periods of acceleration (or deceleration) of the helicopter in flight. These corrections are usually taken care of by linking levers 83, 115, 121 and the engine power control to coordinating and integrating systems that are neither described nor discussed herein because they are beyond and outside the scope of the present invention. Therefore, command levers 83, 115 and 121 are not usually directly handled by the pilot and, for that reason, are referred to as command levers, without reference to the pilot. As is the case with helicopters of the type envisioned, with a driving shaft such as 3 of FIG. 1, the torque exerted on rotating housing 9 must be counteracted by a tail blade, unless a dual contrarotating lift blade system is used.

The second embodiment of the present invention is based on the well known fact that, because of their length, helicopter blades can never be made very rigid. Furthermore, their rigidity is not all that important. Therefore, the torsion or twisting of such blades, spanwise, is eash and can be both contolled and exploited. Because the amount of collective pitch, especially at full load, is usually quite larger than the total cyclic pitch amplitude required, the cyclic pitch effect can also be obtained by twisting the blade between its tip and its root. The angle of attack of the blade root determines the collective pitch and remains unchanged as the blades gyrate around central shaft 57. The second embodiment presented in FIGS. 10 to 15 achieves just that. A typical blade used in such an embodiment is shown in FIGS. 13 and 14. The blade skin 2 is very strong and stiff in the longitudinal direction, but its cross-section has a low shear modulus. The increasing use of high strength fibers or filaments made of materials with a high modulus of elasticity in the fabrication of helicopter blades is generalizing that trend. Because such blades can be twisted with little applied torque, the total amount of acceptable twist is large enough to cover the range of cyclic pitch required. Furthermore, because of the blade tapering between root and tip, most of the twisting occurs in the outermost half of the blade span, where, incidentally, most of the lift is generated. FIG. 14 shows a typical blade cross-section profile which is located at approximately ⅓ of the blade span from the root station 6. Such a section has a small moment of inertia around its center of inertia (point 0). From this point on toward the blade tip, the aspect ratio of the blade profiles (chord length/section thickness) is larger and larger up to station 8 at the blade tip. Assuming that root spar 6 is held fixed angularly, one easily sees why a small torque applied on end spar 8 at the blade tip can twist the blade appreciably, without creating excessive shear stresses in the blade skin. The amounts of twisting required are illustrated in the diagrams of FIG. 16. The presence of intermediate spar assemblies such as 10, located at intervals to support the skin, do not affect the blade twistability, but serves to increase its longitudinal stiffness and to help maintain the blade profiles in flight. These intermediate spars also play a vital role in guiding and holding internal torsional hollow shaft 4 in place. The outer surface of shaft 4 can slide and rotate within support journal bearing 14. The blade skin material and the hollow shaft material, their respective dimensions and shapes are all such that the blade skin and the hollow shaft elongate the same amount as they share the axial loads created by the centrifugal forces developed by the blade gyration. Therefore, as these loads vary and as the distance between spar 6 and spar 8 changes as a result of the axial loading variation, at the blade tip, there is no relative axial displacement between end spar 8 and the end of hollow shaft 4. As an example, hollow shaft 4 could be made of beryllium alloy characterized by a low density and high modulus of elasticity, whereas the skin is reinforced with low density, high strength, high modulus of elasticity fibers. It is also important that hollow shaft 4 have a high shear modulus to minimize the torsional deformation along its length. Its section moment of inertia is maximized by using a tube with an outside diameter as large as the thickness of the blade profiles allow. The influence of the torque, to be exerted on splines 16, on the hollow shaft torsional deformation is thus minimized.

Referring now to FIG. 10, roller 103 should be in the position 103' shown in phantom lines because the contact between cam 101 and roller 103 is at point 0 in this case, as shown in FIG. 11. Because of the presence of spring 42, located in the back, and for the sake of clarity, lever 40 is shown broken in FIG. 10, with roller 103 being shown farther to the right than its true position, assuming that cam 101 is actually in the position shown. FIG. 11 shows the exact position relationship of roller 103 and cam 101, with cam 101 being in its neutral position (no cyclic pitch) such as N. In this second embodiment of the present invention, the 90° angular offset of cam 101, as mentioned in the case of the first embodiment, does not exist. The command levers identified in FIG. 1 are the same and play the same roles as is the case for the first embodiment.

As housing 9 rotates around central shaft 57, the relative motions of cam 101, both vertically and circularly with respect to housing 9 cause toggle lever 40 to slide on shaft 44 so that control shaft 20 is made to move axially in a corresponding fashion. Because splines 30 and 32 are axially disposed, the motion has no effect on hub 112. However, that motion causes end spar 8 at the tip of blade 11 to rotate, thereby producing the spanwise twisting of blade 11 and thus generating the cyclical pitch motion required. Again, the synchronization is automatic and the cyclic pitch amplitude is adjustable. As hub 112 is rotated, the cyclic pitch angle oscillates around any setting of the collective pitch angle imposed on hub 112 and blade 11 root. As hub 112 angular position is reset, so is the angular position of control shaft 20, but without affecting roller 103 and cam 101 positions. Again, as was just demonstrated, collective and cyclic pitch controls are truly and fully independent. The vertical position of sliding sleeve 69, by means of slots 65, rollers 56 and lever arm 54 determines the angular position of flange 52 and thereby of hub 112, and thus the amount of lift.

Referring to FIGS. 10, 12 and 15, it can be seen that, when sliding sleeve 69 rotates either because splines 73 and 75 are helically configured, or because slots 65 are helically shaped within wall 67, as shown in FIG. 6, in this second embodiment, rollers 56 move in one plane tangent to wall 56, as indicated by points o, r and l of FIG. 15. Points o, r and l correspond to the same points (or points of contact of rollers 56) o, r and l of FIG. 12 and which define the amplitude of the oscillations of lever arm 54. To accommodate the displacements of rollers 56 within slot 65 and still insure that the contact points of roller 56 remain within the thickness of wall 67 at all times, wall 67 must be thicker than that shown in FIG. 1. Phantom lines 96 and 98 of FIG. 10 indicate how much the wall thickness must be increased and both correspond to the wall surfaces 96' and 98' of FIG. 15. The sphericity of the external surface of rollers 56 also insures that rollers 56 are constantly guided and restrained within slots 65, within the angular range $A_1+A_2$, which is larger than the angular range $\alpha_1+\alpha_2$ and which corresponds to the maximum angular displacement of lever 54.

For both embodiments of the present invention, the correction of cyclic pitch direction required to compensate for the blade disk change of inclination needed to accelerate (or decelerate) the helicopter along its flight path, during such transient operating conditions, is handled by a system which is not part of the present invention but which is of standard use in helicopters already. However, to understand how the direction of the cyclic pitch neutral axis (or the position of cam 101) relates to the flight direction of the helicopter, it is useful to follow what takes place during a typical acceleration forward of typical helicopter 100 shown in phantom lines in FIG. 17. Assuming that the helicopter is hovering and still, the two blades 11 and 11' provide the lifting force to support the helicopter, as they gyrate in the direction of arrow f. The velocities $V_o$ and $V_o'$ are nil. Assuming that the pilot decides to give the helicopter a forward velocity $V_o$ and that this is achieved by moving the contact point of cam 101 represented by point 0 of FIG. 17, in the direction of the desired motion of the helicopter, the pilot moves O to $O_1$ which, by convention, increases the cyclic pitch angle of the blades when they are on line $OX'$ and decreases the cyclic pitch angle of these blades when they are on line $OX$. The center of lift of the blade disk 102 is then moved from 0 to point $P_1$. This produces a tilting of disk 102 and thereby of the helicopter around axis $Y—Y'$. If this is achieved extremely slowly, as a first approximation, the gyroscopic effect of blade disk 102 can be ignored. The axis of the column of air displaced by the blades also tilts, which generates the horizontal thrust component needed to push the helicopter forward. As the helicopter is being accelerated forward, it increases its forward velocity $V_o$ and the air relative velocity $V_o'$ also increases. The blades then move at a different relative velocity with respect to the ambient air, depending on their position relative to axis $X—X'$. A point M located on the leading edge of blade 11 has a relative velocity $V_1 = V_M + V_o'$, but the corresponding point M' located on the leading edge of blade 11' has a lower relative velocity $V_r = V_{M'} - V_o'$. Of course M becomes M', and vice versa, as the blades rotate 180°. Therefore, blade 11 develops more lift than blade 11' and the lift center is now $P_1$. If nothing were done, the helicopter would tilt around axis $X—X'$ and the helicopter would now move in a direction such as $OZ$. But direction $OX$ is the course chosen by the pilot. Assuming that the helicopter is no longer accelerating and has then reached the selected velocity $V_o$, a correction of the position $O_1$ of cam 101 contact is needed to bring point $P_1$ back to P, where it must be, if the helicopter is to follow the desired course. By convention, it was earlier assumed that the lift point moves in a direction opposite to that of point 0, then point $O_1$ must move to a point such as $O_2$ and point $P_1$ returns to P. Now a steady flight situation is finally reached. If additional corrections, for gyroscopic effects for instance, are ignored, one sees that, to make the helicopter fly in the direction $OX$, the neutral axis (cam 101 angular position for which both blades have the same angle of attack) of the cyclic pitch cam (101) must be located within the quadrant $OX$-$OY$, for example halfway angularly between $OX$ and $OY$. Because the helicopter acceleration can never be kept extremely low, the effect of the gyroscopic moment should now be discussed and can be treated as an extra correction superimposed on the previous one. For the sake of simplicity, it is assumed that the pilot causes the cyclic pitch of the blades to change instantaneously from 0 to the value that corresponds to velocity $V_o$ that the pilot wants to reach. The cyclic pitch change of the blades causes the blade disk to try to tilt around the pitch cam neutral axis as the helicopter is still hovering. Concurrently, another tilting motion around another axis located in the blade disk and perpendicular to the first axis above mentioned is induced by the gyroscopic effect that is well known in body dynamics. This undesired tilt of the blade disk, while the helicopter has hardly started to move in any direction, would cause the helicopter to be subjected to an undesirable sideway thrust and the craft would then move in a direction almost normal to that which is wanted. This is not acceptable and this condition must either be remedied or anticipated and corrected ahead of time. This, more so than the other effect first discussed, is the reason for the helicopter pilots' rule of: "you move the stick 90° from the way you want to go"; which is not quite 90° in fact, but close enough to that for the sake of this discussion. Upon superposition of these two effects, the effective motion of the "stick" or of point 0 of FIG. 17, in real time, is more like that which is illustrated in FIG. 18. Axes $X—X'$ and $Y—Y'$ are the same as those shown in FIG. 17, the phantom line circles indicate cam 101 contours and the thick line is the path followed by point 0 (cam 101 contour center in this case) during the acceleration period from hovering to selected velocity $V_o$. The thin solid line corresponds to a similar path for point 0 if the helicopter were made to move backward. Points 1, 2, 3, 1' and 2' are the centers of circles 1, 2, 3, 1', and 2' respectively. These circles correspond to intersections of the external surface 105 of cam 101 by planes perpendicular to the plane of FIG. 1 along lines such as $N—N'$ (no cyclic pitch, hovering condition) or $X—Y$ (which corresponds to circle 1 of FIG. 18 for instance). Circle 3 is the intersection that corresponds to point 0' (contact point between cam 101 and roller 103) having moved to the very top of cam surface 105 ($V_{max}$ of the helicopter). Line B is the projection on the plane of FIG. 1 of the envelope of all these circles. It should be mentioned that roller 103 in FIG. 1 does not move vertically, but that central shaft 57 and cam 101 do.

The transient sequence of events that take place between the hovering condition and that of flight at full speed ahead can now be summarized as follows: (1) Command lever 115 lowers central shaft 57, (2) Cam 101 is concurrently lowered by the same amount, (3) The amount of cam 101 travel downward determines the forward velocity that the helicopter will reach, (4) Command lever 121 orients central shaft 57 and cam 101 with respect to the helicopter frame in a direction such that the helicopter will fly in the direction selected by the pilot, (5) A small increase in engine power is caused to take place to compensate for the extra energy needed to accelerate the craft, (6) A concurrent adjustment of the collective pitch by means of command lever 83 might be required if level flight is expected of the craft, (7) Trim adjustments or monitoring of the craft direction by means of the tail end blade or of cam 101 are made by the pilot as required.

Of the two side effects in the helicopter response to a change in cyclic pitch adjustment discussed above, one has an influence that manifests itself much faster: the gyroscopic effect. This is this side effect that the present invention can help mitigate, in terms of its manifestation. For a given instantaneous change in cyclic pitch setting, as soon a the blade disk attempts to vary its tilt angle, in response to the action of the difference of cyclic pitch amplitude demanded by the pilot, the blade disk imposes the resulting gyroscopic moment mentioned earlier on the helicopter, around the axis which corresponds to the smallest moment of inertia of the helicopter. The helicopter responds almost immediately. Whereas, the helicopter velocity response to the change in cyclic pitch is much slower. The helicopter must first accelerate (or decelerate) and the whole weight of the helicopter is affected. Further, the changes in the helicopter horizontal lift component cannot occur until and unless the effects of the gyroscopic moment have been handled by the helicopter. Therefore, the second order correction needed in the orientation of the cyclic pitch to maintain the helicopter bearing intended by the pilot, as discussed earlier, takes place much later, gradually and during a time long enough to allow the pilot to respond without having to hurry. But the response to the gyroscopic moment is quasi immediate and most bothersome. Therefore, it is worthwhile discussing a feature of the present invention that alleviates somewhat this difficulty of having first to move the cyclic pitch stick in a direction making a right angle with the direction of flight, as discussed earlier. This discussion applies only to helicopters that have blades rigidly connected to the helicopter rotor, which is the case of the present invention, especially in the case of twistable blades. Some helicopters have rigid blades that are articulated onto the rotor. In this case, the gyroscopic moment, or for that matter any moment imposed on the blade disk, is decoupled from the helicopter body. This decoupling effect delays the helicopter response to an abrupt change in cyclic pitch adjutment, which is also helpful. In the present invention, the helicopter blade drive that causes the helicopter first to respond dynamically, and seemingly, in the direction of the cyclic pitch change initiation, and later, in the direction of the effect of the gyroscopic moment, is that which is shown in FIGS. 1, 2 and 3. The words "first" and "seemingly" used above indicate that only the immediate initial response of the helicopter to the gyroscopic moment is thereby affected and referred to.

Lever arm 37, when roller 103 is pushed out by cam 101, is forced to oscillate around an axis positioned at a right angle with respect to the direction of motion of contact point 0 (FIG. 3) between roller 103 and cam 101. This is due to the manner in which the other end of lever 37 is connected to the splined axle 31 of the cyclic pitch control shaft. This shaft, in line with the blade longitudinal axis of rotation, and concentric with the blade hub guides and sets the oscillation of lever 37 around an axis positioned at right angle with respect to the path followed by the roller mounted on its other end. A reversed-direction type of motion then results and that corresponds exactly to the description just made. In order to obtain this right angle relationship, the number of blades for each rotor is practically limited to two or four. It can easily be seen in FIG. 2 that the "angled" arm section of lever 37 and which holds roller 103 can just as easily be flipped 180° and then made to be actuated by a point on cam 101 surface located 180° from point 0, around cam 101.

Based on the choice of rotation of cam 101 with respect to rotor body 9 (or more exactly of rotor body 9 with respect to the reference direction system imposed by the helicopter airframe structure 1, because cam 101 is rotationally fixed with respect to this reference structure), for a given relationship between cam 101 eccentricity and cyclic pitch amplitude, i.e. an increase of eccentricity causes an increase in cyclic pitch amplitude, the configuration of lever 37 (or the way its roller-holding arm is oriented) determines whether the gyroscopic moment causes the blade disk to tilt in phase with the position of roller 103 or out of phase by 180°. It seems that making both act in unison and in the same direction is preferable. Thus, an abrupt change in the axial position of roller 103, caused by cam 101 being moved quickly in the vertical direction (change of cyclic pitch amplitude imposed on all blades by the pilot) causes all blades to react instantaneously and simultaneously, but apparently around a vertical symmetry plane located orthogonally to the vertical plane in which the motion of point O took place. It is easy to understand how the position of point 0 is dictated by both the angular and axial positions of cam 101. Therefore cam 101 can be referred to as "bidimensional" cam because any roller contact point, such as O, is set by the motion of the cam surface along two orthogonal directions: vertical and lateral (or sideways). In FIG. 3, the maximum travels of point O are shown as X for the lateral motion that determines the direction of the plane of symmetry of the cyclic pitch variation, during one full blade gyration, and Y for the vertical (or axial) motion of cam 101, and which dictates the amplitude of the cyclic pitch angle around the set collective pitch. Cam 101 is of course set with respect to helicopter structure 1 in a manner such that its fixed vertical plane of symmetry is the vertical plane of symmetry of the helicopter, as a first approximation, or by convention, and for ease of explanation.

Because each blade can turn around two orthogonal axes, for ease of understanding, the rotation of the blade-rotor assembly around the vertical axis as a single body is referred to as gyration. The blade rotation around its hub and its longitudinal axis is referred to as rotation. A blade can thus gyrate and rotate, the rotor can only gyrate. A gyration is one full turn of any blade around its axis of gyration. The blade rotation is limited to an angle equal to the maximum collective pitch angle + half of the maximum amplitude of the cyclic pitch angle. Under steady foward flight conditions, for ease of explanation, it is assumed that the cyclic pitch angle is nil when a blade is parallel to the helicopter longitudinal axis.

The collective pitch is adjusted, in both basic configurations of the present invention, by acting directly on the blade hub which cannot move and is fixed axially. The centrifugal force developed by the blade gyration, always maintains the hub flange against the rotor body, acting as a positive stop. Therefore, the blade root profile is always located at a fixed distance from the gyration axis. These centrifugal forces, one for each blade, balance themselves out and are reacted by the rotor body structure. The lift forces and moments developed by these blades are all transmitted to that structure which must be massive and strong enough to minimize any deformation of the rotor body that might affect the operation of the collective and cyclic pitch actuating and control mechanisms located therein.

The other structural deformation, programmed in this instance, of interest is that of the twistable blades, and which is used to adjust and control the amount of blade cyclic pitch. As earlier discussed, the blade skin is reinforced with fibers with high strength and modulus of elasticity, in the longitudinal direction. Rotationally however, the blades are very flexible and can easily be twisted, between the tip and the hub. The blade thickness is very small compared to its length, less than 1%. Its mean profile chord is less than 5% of its length, typically. The maximum total angular variation between blade tip and hub, from the neutral (no twisting imposed) blade shape to that which corresponds to the maximum amplitude of the cyclic pitch variation for a full blade gyration, is less than 15° to 20°. For such a small angular rotation, over a length of more than 30 times the distance from the farthest blade skin fiber (blade trailing edge) to the blade twisting axis, the influence of such twisting on the blade length change caused by said twisting is obviously negligible. It is of lesser importance than that caused by the blade flexing resulting from lift force actions.

Although the collective pitch actuation is performed positively in both directions (increase and decrease, no spring-loaded return actuation), the cyclic pitch actuation is positive in one direction only, for reasons of mechanical simplicity. A bidimensional cam cannot easily be made to provide a positive actuation in both directions of push and pull. It can easily be made to push, but pulling in addition to pushing is not practical. The return spring arrangements shown in FIGS. 1, 2, 3, 10 and 11 can only be used to maintain the rollers applied onto the surface of the bidimensional cam and in place, when the rotor is not gyrating. However, a more positive and reliable approach must be used to force the blades to decrease their cyclic pitch angle as required between the maximum and the minimum of its sinusoidal amplitude variations, and whenever the pilot demands a cyclic pitch decrease. To insure that other external forces are always available to return all parts and components of the cyclic pitch actuation means toward a position of minimum pitch for all blades, at all times, the hub axis and the longitudinal axis of rotation (point O of FIG. 14) is located between the blade leading edge and the center of pressure (c.p. of FIG. 14), for all blade angles of attack between O and the blade stall angle. This makes the blade operation stable, preventing fluttering, and also eliminates the possibility of vibrations being generated in the components of the collective pitch actuating and control means. This requires that all helically-transformed displacements of axial into rotational motion must be reversible. This condition is met by using ball bearings between all of the "male" and "female" helical grooves of such actuation means, which minimizes friction to a level such that reversibility of motion is always present. It should be noted here that the helix angles of such grooves, as shown in the drawings, have been exagerated for ease of illustration. Naturally induced vibrations and the return spring forces contribute to facilitating this motion reversibility.

A shown in FIGS. 1 and 10, the gaps between all shafts, hubs, sliding and rotating surfaces emerging out of the rotor body are sealed by slip seals arranged in a manner such that the internal cavity of the rotor is completely sealed. All mechanisms contained inside that cavity are protected from the environmental hazards that the helicopter may encounter during its operation, either in flight or on the ground, and that normally play havoc with the conventional swash plate mechanisms. In the configuration shown in FIG. 1, the rotor cavity stops at the blade root spar and the whole cavity internal volume is well defined. In the configuration shown in FIG. 10, the control shaft actuating the twistable blade tip must go through the blade root spar. The twistable blade internal volume cannot have lubricant accumulating inside. A seal S shown schematically in FIG. 13, located on the outer side of bearing 128 of FIG. 10, isolates the blade internal volume from the rotor cavity. Although axle 4 is hollow, it is not open at the end where it is connected to cyclic pitch control shaft 20.

Because the rotor cavity and the twistable blade inner volume are both sealed off from the outside and isolated from each other, lubricant cannot leak or escape outside, which makes the lubrication both easy and effective. The lubrication means used are not shown in the drawings, being both simple state-of-the-art and easy to visualize. In the case of twistable blades, the helical-grooves-balls assemblies located in the blade end spar are packed with lubricant upon assembling and sealed. All of the other bearings located inside the rotor cavity can easily be lubricated the same way and sealed. The other sliding and rolling surfaces of the components contained in the rotor cavity can be lubricated by oil contained in the sump formed by the lower half of the rotor cavity. Reinforcing ribs such as R of FIGS. 1 and 10 force the oil to gyrate with the rotor and slosh around to provide an oil mist inside the rotor cavity, adequate to keep all sliding and rolling surfaces well lubricated. All these surfaces move at low velocities relatively to one another and not much heat is locally generated by such a small amount of sliding and rolling friction. The lubrication is intended mostly to keep friction down to minimize the wear of these surfaces.

The present invention has only one drawback: it cannot accommodate flexibly articulated blades, in the case of twistable blades, unless actuated as are rigid blades. In the case of rigid blades, an articulation can be provided at the outer end of the hub, in a manner similar to that of articulated blades actuated by a swash plate. Otherwise, it offers several advantages such as:

long lifetime because of the low wear of moving parts, which are constantly lubricated and well isolated from environmental hazards, both in flight and on the ground, easy and fast maintenance, which lessens the amount of down time and increases the operating time, thereby decreasing the helicopter operation costs, low risks of failures and accidents, therefore providing a safer type of operation, and generally, a more reliable aircraft, less dangerous and easy to fly, is the result of the improvements herein described.

Having thus described my invention, I now claim:

1. A helicopter blade pitch control system, said system comprising:
    a fixed housing for mounting on an airframe;
    a rotatable housing mounted on said fixed housing for rotating about a substantially vertical axis;
    a plurality of blades, each having a pitch axis substantially orthogonal to said substantially vertical axis, rotatably mounted at an inner end to said rotatable housing and extending radially outward therefrom for rotation about said pitch axis;
    a central support shaft mounted within said housings and extending along said vertical axis;
    cyclic pitch control means comprising an axially moveable radial cam non-rotatably mounted on said central support shaft for imposing a selective cyclic pitch on said blades as said rotatable housing rotates about said vertical axis; and
    collective pitch control means comprising an axially moveable cam mounted on said support shaft for axial movement thereon, pilot input control means for selectively moving said axially moveable cam along said support shaft, and a lever follower engaging said cam and operatively connected to said blades for independently imposing a collective pitch on said blades independently of said cyclic pitch control means.

2. A helicopter blade control system according to claim 1 wherein:
said cyclic pitch control means includes arm means engaging said radial cam, and means connecting said arm to said blade for cyclically altering the pitch thereof.

3. A helicopter blade control system according to claim 2 wherein:
said means for connecting said arm to said blade includes a control shaft having splines thereon and mounted for axial movement.

4. A helicopter blade control system according to claim 3 wherein:
one of said axial cam and said radial cam is connected for rotation of said control shaft, and the other of said cams is connected for movement of said control shaft axially for rotation of said blade.

5. A helicopter blade control system according to claim 4 wherein:
said control shaft is connected to said blade by means of helical splines so that axial movement of said control shaft rotates said blade about its pitch axis.

6. A helicopter blade control system according to claim 2 wherein:
said radial cam is fixed to said central shaft and said shaft is axially moveable and rotatable for adjusting said cam for adjusting the degree and orientation respectively of said cyclic pitch.

7. A helicopter blade control system according to claim 5 wherein:
said axial cam is mounted for axial movement along and rotational movement relative to said central shaft, and axial movement of said axial cam rotates said lever about an axis.

8. A helicopter blade control system according to claim 4 wherein:
said arm means comprises an arm splined to said control shaft and rotatable about the axis thereof for rotating said shaft; and
said lever follower includes means for moving said control shaft axially for selecting said collective pitch.

9. A helicopter blade control system according to claim 8 wherein:
said lever follower is rotatably mounted on said central support shaft and includes radial cam means rotatable therewith, and second follower means engaging said second radial cam and connected to said control shaft for axial movement of said control shaft.

10. A helicopter blade control system according to claim 4 wherein:
said arm means comprises an arm mounted for sliding movement along said pitch axis and is connected to said control shaft for movement of said control shaft along said pitch axis; and
said lever follower is mounted for pivoting movement about said pitch axis for rotation of said control shaft about said pitch axis.

11. A helicopter control system according to claim 10 wherein:
said control shaft extends the length of said blade and is connected thereto by means of helical splines at the outer end and by means of straight splines at the inner end thereof so that axial movement of said control shaft rotates the outer end of said blade relative to the inner end thereof.

12. The helicopter blade pitch control system, said system comprising:
a fixed housing for mounting on an airframe;
a rotatable housing mounted on said fixed housing for rotating about a substantially vertical axis;
a plurality of blades, each having a pitch axis substantially orthogonal to said substantially vertical axis, rotatably mounted at an inner end to said rotatable housing and extending radially outward therefrom for limited rotation about said pitch axis;
a central support shaft mounted within said housings and extending along said vertical axis;
cyclic pitch control means comprising a first radial cam mounted on said central support shaft for axial and rotational movement with said central support shaft, and arm means engaging said first radial cam and connected to said blades for imposing a selective cyclic pitch on said blades as said rotatable housing rotates about said vertical axis; and
collective pitch control means comprising an axially moveable cam mounted on said support shaft for axial movement thereon, pilot input control means for selectively moving said axially moveable cam along said support shaft, and a lever follower engaging said cam and operatively connected to said blades for independently imposing a collective pitch on said blades independently of said cyclic pitch control means.

13. A helicopter blade control system according to claim 12 wherein:
said means for connecting said arm to said blade includes a control shaft having helical splines thereon and mounted for axial movement along said pitch axis.

14. A helicopter blade control system according to claim 13 wherein:
one of said axial cam and said radial cam is connected for rotation of said control shaft, and the other of said cams is connected for movement of said control shaft axially for rotation of said blade.

15. A helicopter blade control system according to claim 14 wherein:
said control shaft is connected to said blade by means of said helical splines so that axial movement of said control shaft rotates said blade about its pitch axis.

16. A helicopter blade control system according to claim 15 wherein:
said radial cam is fixed to said central support shaft and said central support shaft is axially moveable and rotatable for adjusting said cam for adjusting the degree and orientation respectively of said cyclic pitch.

17. A helicopter blade control system according to claim 16 wherein:
said axial cam is mounted for axial movement along and rotational movement relative to said central shaft, and axial movement of said axial cam rotates said lever about an axis.

18. A helicopter blade control system according to claim 16 wherein:
said arm means comprises an arm splined to said control shaft and rotatable about the axis thereof for rotating said shaft; and said lever follower includes means for moving said control shaft axially for selecting said collective pitch.

19. A helicopter blade control system according to claim 18 wherein:
said lever follower is rotatably mounted on said central support shaft and includes second radial cam means rotatable therewith, and second follower means engaging said second radial cam and connected to said control shaft for axial movement of said control shaft.

20. A helicopter blade control system according to claim 14 wherein:
said arm means comprises an arm mounted for sliding movement along said pitch axis and is connected to said control shaft for movement of said control shaft along said pitch axis; and
said lever follower is mounted for pivoting movement about said pitch axis for rotation of said control shaft about said pitch axis.

21. A helicopter control system according to claim 20 wherein:
said control shaft extends the length of said blade and is connected thereto by means of helical splines at the other end and by means of straight splines at the inner end thereof so that axial movement of said control shaft rotates the outer end of said blade relative to the inner end thereof.

22. A helicopter blade pitch control system, said system comprising:
a fixed housing for mounting on an airframe;
a rotatable housing mounted on said fixed housing for rotating about a substantially vertical axis;
a plurality of blades, each having a pitch axis substantially orthogonal to said substantially vertical axis, rotatably mounted at an inner end to said rotatable housing and extending radially outward therefrom for rotation about said pitch axis;
a central support shaft mounted within said housings and extending along said vertical axis;
cyclic pitch control means comprising a first radial cam mounted on said central support shaft for axial and rotational movement with said central support shaft, and arm means engaging said first radial cam and connected to said blades for imposing a selective cyclic pitch on said blades as said rotatable housing rotates about said vertical axis, said means for connecting said arm to said blade includes a control shaft having splines thereon and mounted for axial movement; and
collective pitch control means comprising an axially moveable cam mounted on said support shaft for axial movement thereon, pilot input control means for selectively moving said axially moveable cam along said support shaft, and a lever follower engaging said cam and operatively connected to said blades for independently imposing a collective pitch on said blades independently of said cyclic pitch control means, one of said axial cam and said radial cam is connected for rotation of said control shaft, and the other of said cams is connected for movement of said control shaft axially for rotation of said blade.

* * * * *